(12) United States Patent
Löbl et al.

(10) Patent No.: US 6,461,929 B1
(45) Date of Patent: Oct. 8, 2002

(54) METHOD FOR THE FINE TUNING OF A PASSIVE ELECTRONIC COMPONENT

(75) Inventors: Hans-Peter H. Löbl, Monschau; Detlef U. Wiechert, Alsdorf, both of (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/479,640

(22) Filed: Jan. 7, 2000

(30) Foreign Application Priority Data

Jan. 16, 1999 (DE) .......................................... 199 01 540

(51) Int. Cl.[7] .............................................. H01L 21/20
(52) U.S. Cl. ............... 438/381; 219/121.68; 219/121.6; 219/121.85; 29/593; 438/940; 438/977
(58) Field of Search ..................... 219/121.69; 438/940, 438/977

(56) References Cited

U.S. PATENT DOCUMENTS

| | | | | |
|---|---|---|---|---|
| 4,330,788 A | * | 5/1982 | Hinz et al. ................... 347/151 |
| 4,392,194 A | * | 7/1983 | Hinz et al. ................... 347/144 |
| 4,924,064 A | * | 5/1990 | Strombom et al. ..... 219/121.69 |
| 5,384,195 A | * | 1/1995 | Bachman et al. ............ 360/122 |
| 5,443,534 A | * | 8/1995 | Vinciarelli et al. ........... 29/740 |
| 5,569,398 A | * | 10/1996 | Sun et al. ............... 219/121.68 |
| 5,685,995 A | * | 11/1997 | Sun et al. ................. 219/121.6 |
| 5,861,709 A | * | 1/1999 | Lobl et al. ................... 313/422 |
| 5,998,759 A | * | 12/1999 | Smart ..................... 219/121.69 |

FOREIGN PATENT DOCUMENTS

DE 3843980 A1 7/1989 ............ H01G/4/34

* cited by examiner

*Primary Examiner*—Matthew Smith
*Assistant Examiner*—Belur V Keshavan
(74) *Attorney, Agent, or Firm*—Ernestine C. Bartlett

(57) ABSTRACT

A method for the fine tuning of a passive electronic component having at least a carrier substrate and at least one electrically conducting layer containing a material having a conducting nitride, a conducting oxynitride, a semiconductor, or chromium, by means of a focused laser emission, which laser emission induces a heating effect which heating effect causes the material to be converted to a locally electrically non-conducting material.

6 Claims, 2 Drawing Sheets

METHOD FOR THE FINE TUNING OF A PASSIVE ELECTRONIC COMPONENT

BACKGROUND OF THE INVENTION

The invention relates to a method for the fine tuning of a passive electronic component which comprises at least a carrier substrate and at least one electrically conducting layer, in which method a heating effect is achieved locally on the electrically conducting layer by means of focused laser emission, and the electrically conducting layer is locally brought into an electrically non-conducting state.

The development of numerous electronic devices is characterized by the following trends: miniaturization, higher reliability, lower or at least constant prices accompanied by an increasing functional level. In spite of all efforts at digitization, the number of passive components in many appliances in the field of consumer electronics, for example in TV sets or video recorders, is found to account for 70% of all components present. The increasing miniaturization in particular has the effect that fluctuations in the basic materials and in the manufacturing process of the passive electronic components have a comparatively great influence on the final electrical specifications.

The thin layer technology, where mainly vaporizing and sputtering methods are used for providing the electrically conducting layers, renders it possible to manufacture, for example, resistors with a tolerance range of ±5%. A better process control in the manufacture of the passive electronic components causes higher process costs.

A possibility of keeping the manufacturing costs as low as possible is formed by the manufacture of passive electronic components such as capacitors, resistors, and inductances with a wide specification range which are then set for the desired final specifications by means of corrective aftertreatments (fine tuning).

DE 38 43 980 discloses a method for the fine tuning of a capacitor which comprises a laser-transparent carrier substrate, a lower electrode, an insulation layer, and an upper electrode by means of laser emission applied to the lower electrode. The laser emission causes a heating effect on the lower electrode, which is made of aluminum or tantalum, such that electrode material is oxidized and is brought into an electrically non-conducting state.

The disadvantage of the method described above is that the metals used, aluminum and tantalum, limit the application of the method described to capacitors, because these metals are not suitable for the realization of resistors on account of their low resistivity values.

SUMMARY OF THE INVENTION

The invention has for its object to develop a general method by means of which the fine tuning of the electronic final specifications of a wide variety of passive electronic components can be carried out.

This object is achieved by means of a method for the fine tuning of a passive electronic component which comprises at least a carrier substrate and at least one electrically conducting layer, in which method a heating effect is achieved locally on the electrically conducting layer by means of focused laser emission, and the electrically conducting layer is locally brought into an electrically non-conducting state, in that the electrically conducting layer comprises a material with a conducting nitride, or a conducting oxynitride, or a semiconductor, or chromium, which layer is converted into a locally electrically non-conducting material by the heating effect.

This method involving the use of the materials mentioned above as the electrically conducting layers has the advantage that the fine tuning of the final electrical specifications takes place without a removal of material and can thus still be achieved also after the incorporation of the component in an electrical circuit.

It may be preferred that the passive electronic component which is fine-tuned is a resistor.

It is possible by means of the method described above to set accurately a desired rated resistance value. A very narrow tolerance range of 1% or better can be achieved thereby.

It may be preferred that the passive electronic component which is fine-tuned is a capacitor which comprises at least two electrically conducting layers and at least one dielectric.

Since the capacitance value of a capacitor depends inter alia on the effective surface areas of the conducting layers, i.e. the electrodes, it is possible to tune also the capacitance value of the capacitor by means of a reduction of the surface areas of the conducting layers.

It may be preferred that the passive electronic component which is fine-tuned is an inductance.

The inductance value can be adjusted by changing the line widths, and thus the line interspacings.

It may furthermore be preferred that the passive electronic component comprises at least a first and a second current supply contact.

Each passive electronic component can be coupled to further components of a circuit or to a measuring device for determining the electronic final specification at its current supply contacts.

The invention further relates to a method of structuring an electrically conducting layer by means of focused laser emission, in which method a heating effect is achieved locally on an electrically conducting layer by means of a laser beam, and the electrically conducting layer is locally brought into a non-conducting state, characterized in that the electrically conducting layer comprises a material with a conducting nitride or a conducting oxynitride, or a semiconductor, or chromium, which material is converted into a locally electrically non-conducting material by the heating effect.

This method has the advantages that it is less expensive than a structuring by means of photolithographical processes combined with dry or wet etching steps, and that no material removal takes place, but instead the electrically conducting material is converted into an insulating material.

The application of the electrically conducting layer structured in accordance with the method described above in a conductive circuit, a resistor, a capacitor, or an inductance is advantageous because the structuring takes place without material removal and can accordingly still take place after incorporation in an electrical circuit.

DETAILED DESCRIPTION OF THE INVENTION

The invention will now be explained in more detail below with reference to two Figures and two embodiments.

Figure 1:
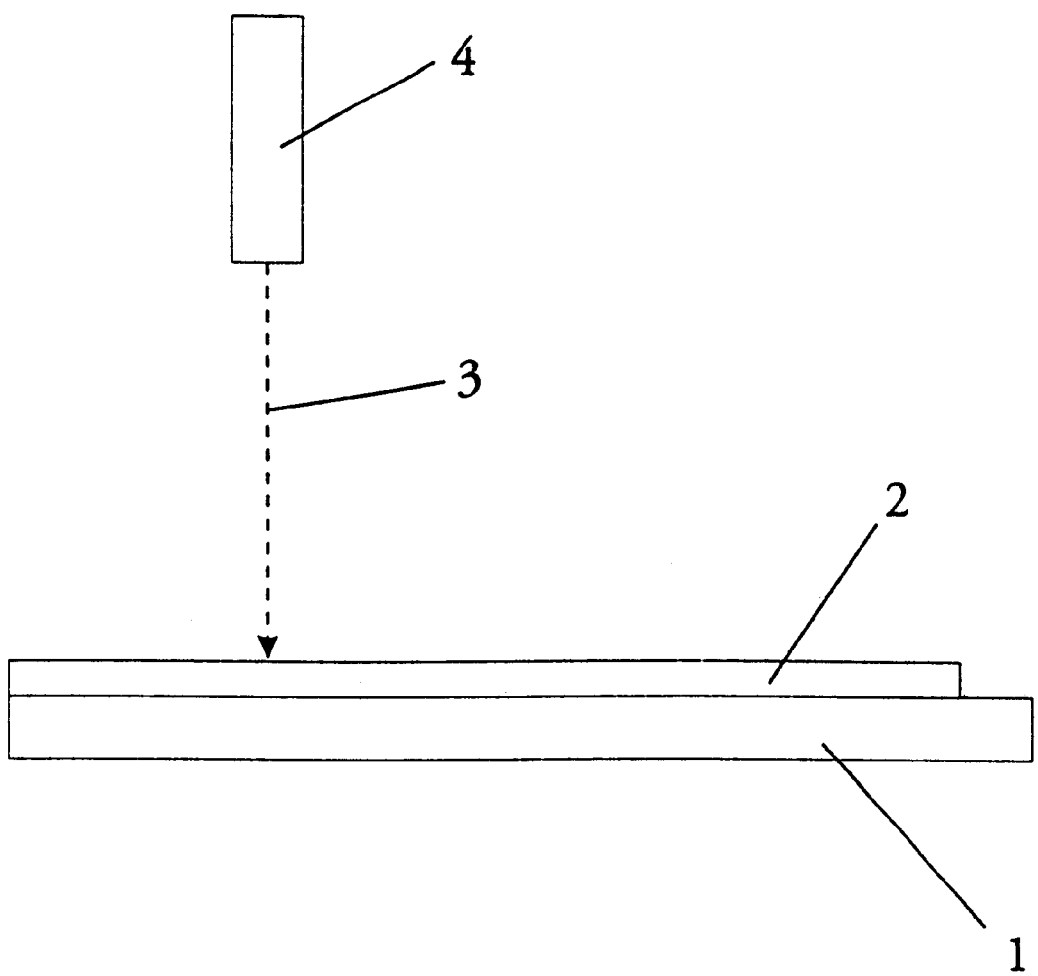
FIG. 1 is a longitudinal lateral sectional view of a resistor whose electrically conducting layer is modified by a focused laser emission.

In FIG. 1, a resistor comprises a carrier substrate 1 which comprises, for example, a ceramic material, a glass-ceramic material, a glass material, or silicon. An electrically conducting layer 2 is provided on the carrier substrate 1, which layer comprises, for example, $TiN_x (0 \leq x \leq 1)$, $TiO_xN_y (0 \leq x \leq 1, 0 \leq y \leq 1)$,
$Ti_xW_yN_z (0 \leq x \leq 1, 0 \leq y \leq 1, 0 \leq z \leq 1)$,
$Ti_uW_vN_wO_x (0 \leq u \leq 1, 0 \leq v \leq 1, 0 \leq w \leq 1, 0 \leq x \leq 1)$,
$TaN_x (0 \leq x \leq 1)$,
$TaO_xN_y (0 \leq x \leq 1, 0 \leq y \leq 1)$
$Cr_xSi_y (0 \leq x \leq 1, 0 \leq y \leq 1)$,
$Cr_xSi_yO_z (0 \leq x \leq 1, 0 \leq y \leq 1, 0 \leq z \leq 1)$,
$Ni_xCr_y (0 \leq x \leq 1, 0 \leq y \leq 1)$,
$Ni_xCr_yAl_z (0 \leq x \leq 1, 0 \leq y \leq 1, 0 \leq z \leq 1)$,
$Si_xN_yO_z (0 \leq x \leq 1, 0 \leq y \leq 1, 0 \leq z \leq 1)$, Si, or Cr. Preferably, layers having a layer thickness of between 10 and 250 nm are used. A structuring of the electrically conducting layer 2 into a resistor layer and/or a fine tuning of the rated resistance value is achieved in that a beam 3 of a laser 4 is focused on the electrically conducting layer 2, so that the electrically conducting layer 2 is locally heated by the beam 3 and is brought into an electrically non-conducting state. The laser 4 may be, for example, an argon laser.

Current supply contacts may be provided on mutually opposed sides of the component for the purpose of coupling the resistor to further elements in a circuit or for connecting it to a measuring device for determining the final electronic specification.

Figure 2:
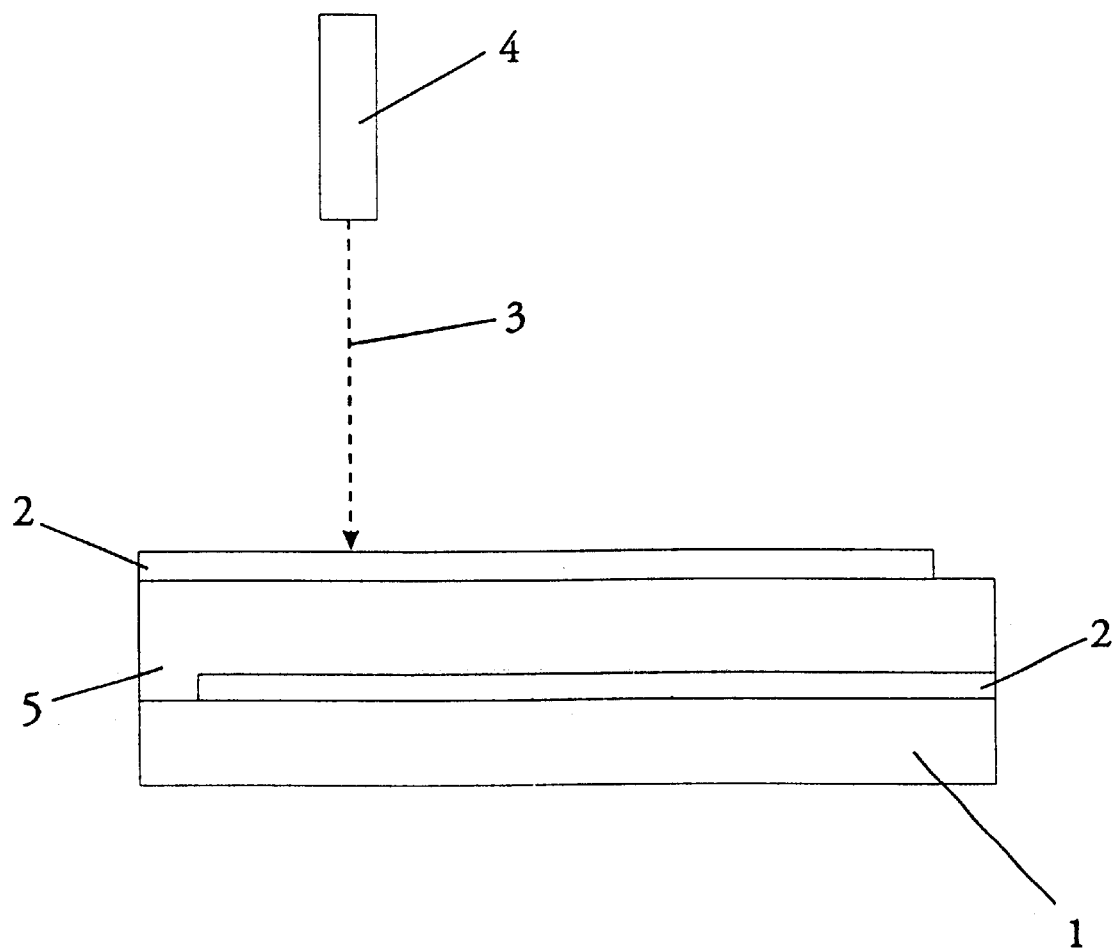
FIG. 2 is a longitudinal lateral sectional view of a capacitor whose upper electrically conducting layer is modified by a focused laser emission.

In FIG. 2, a capacitor comprises a carrier substrate 1 which comprises, for example, a ceramic material, a glass ceramic material, a glass, or silicon. An electrically conducting layer 2 is provided on the carrier substrate 1, which layer comprises, for example, $TiN_x (0 \leq x \leq 1)$,
$TiO_xN_y (0 \leq x \leq 1, 0 \leq y \leq 1)$,
$Ti_xW_yN_z (0 \leq x \leq 1, 0 \leq y \leq 1, 0 \leq z \leq 1)$,
$Ti_uW_vN_wO_x (0 \leq u \leq 1, 0 \leq v \leq 1, 0 \leq w \leq 1, 0 \leq x \leq 1)$,
$TaN_x (0 \leq x \leq 1)$,
$TaO_xN_y (0 \leq x \leq 1, 0 \leq y \leq 1)$
$Cr_xSi_y (0 \leq x \leq 1, 0 \leq y \leq 1)$,
$Cr_xSi_yO_z (0 \leq x \leq 1, 0 \leq y \leq 1, 0 \leq z \leq 1)$,
$Ni_xCr_y (0 \leq x \leq 1, 0 \leq y \leq 1)$,
$Ni_xCr_yAl_z (0 \leq x \leq 1, 0 \leq y \leq 1, 0 \leq z \leq 1)$,
$Si_xN_yO_z (0 \leq x \leq 1, 0 \leq y \leq 1, 0 \leq z \leq 1)$, Si, or Cr. Preferably, layers having a layer thickness of between 10 and 250 nm are used. The electrically conducting layer 2 is structured into an electrode by means of focused laser emission. A dielectric layer 5, for example made from $Si_3N_4$, is deposited on this electrically conducting layer 2. A further electrically conducting layer 2, preferably having a layer thickness of between 10 and 250 nm, is deposited on the dielectric layer 5, which further layer comprises, for example, $TiN_x (0 \leq x \leq 1)$,
$TiO_xN_y (0 \leq x \leq 1, 0 \leq y \leq 1)$,
$Ti_xW_yN_z (0 \leq x \leq 1, 0 \leq y \leq 1, 0 \leq z \leq 1)$,
$Ti_uW_vN_wO_x (0 \leq u \leq 1, 0 \leq v \leq 1, 0 \leq w \leq 1, 0 \leq x \leq 1)$,
$TaN_x (0 \leq x \leq 1)$,
$TaO_xN_y (0 \leq x \leq 1, 0 \leq y \leq 1)$
$Cr_xSi_y (0 \leq x \leq 1, 0 \leq y \leq 1)$,
$Cr_xSi_yO_z (0 \leq x \leq 1, 0 \leq y \leq 1, 0 \leq z \leq 1)$,
$Ni_xCr_y (0 \leq x \leq 1, 0 \leq y \leq 1)$,
$Ni_xCr_yAl_z (0 \leq x \leq 1, 0 \leq y \leq 1, 0 \leq z \leq 1)$,
$Si_xN_yO_z (0 \leq x \leq 1, 0 \leq y \leq 1, 0 \leq z \leq 1)$, Si, or Cr, and is structured into an electrode by means of focused laser emission. Structuring of the electrically conducting layer 2 and/or fine tuning of the capacitance value is achieved in that a beam 3 of a laser 4 is focused on the electrically conducting layer 2, so that the electrically conducting layer 2 is locally heated by the beam 3 and is brought into an electrically non-conducting state. The laser 4 may be, for example, an argon laser.

Current supply contacts may be provided on mutually opposed sides of the component so as to couple the capacitor to further elements of a circuit or to connect it to a measuring device for determining the final electronic specification.

Embodiments of the invention which represent examples of how the invention may be realized will now be explained below.

Embodiment 1

An electrically conducting layer 2 of TaN having a thickness of between 100 and 250 nm is provided on a carrier substrate 1 of borosilicate glass by means of reactive DC magnetron sputtering and is structured into a resistor layer by means of focused laser emission. End contacts are then provided on mutually opposed sides. The structuring of the electrically conducting layer and/or a fine tuning of the resistance value are achieved in that a beam 3 of an argon laser 4 is focused on the electrically conducting layer 2, such that the electrically conducting layer 2 is locally oxidized by the beam 3 and is brought into an electrically non-conducting state.

Embodiment 2

An electrically conducting layer 2 of TiN is provided on a carrier substrate 1 of glass and is structured into an electrode by means of focused laser emission. A dielectric layer 5 of $Si_3N_4$ is deposited on this electrically conducting layer 2. A further electrically conducting layer 2 of TiN is provided on said dielectric layer 5 and is structured into an electrode by means of focused laser emission. The structuring of the electrically conducting layers 2 and/or the fine tuning of the capacitance value of the capacitor are achieved in that a beam 3 of an argon laser. 4 is focused on the electrically conducting layers 2, whereby the electrically conducting layers 2 are locally oxidized and are brought into an electrically non-conducting state.

What is claimed is:

1. A method for the fine tuning of a passive electronic component which comprises at least a carrier substrate (1) and at least one electrically conducting layer (2), in which method a heating effect is achieved locally on the electrically conducting layer (2) by means of focused laser emission, and the electrically conducting layer (2) is locally brought into an electrically non-conducting state, characterized in that the electrically conducting layer (2) comprises a material with a conducting nitride, or a conducting oxynitride, or a semiconductor, or chromium, which layer is converted into a locally electrically non-conducting material by the heating effect.

2. A method as claimed in claim 1, characterized in that the passive electronic component which is fine-tuned is a resistor.

3. A method as claimed in claim 1, characterized in that the passive electronic component which is fine-tuned is a capacitor which comprises at least two electrically conducting layers (2) and at least one dielectric (5).

4. A method as claimed in claim 1, characterized in that the passive electronic component which is fine-tuned is an inductance.

5. A method as claimed in claim 1, characterized in that the passive electronic component comprises at least a first and a second current supply contact.

6. A method of structuring an electrically conducting layer (2) by means of focused laser emission, in which method a heating effect is achieved locally on an electrically conducting layer (2) by means of a laser beam, and the electrically conducting layer (2) is locally brought into a non-conducting state, characterized in that the electrically conducting layer (2) comprises a material comprising a conducting nitride or a conducting oxynitride, or a semiconductor, or chromium, which material is converted into a locally electrically non-conducting material by the heating effect.

* * * * *